(12) United States Patent
Son

(10) Patent No.: US 11,511,447 B2
(45) Date of Patent: Nov. 29, 2022

(54) ROBOT ARM

(71) Applicant: LG ELECTRONICS INC., Seoul (KR)

(72) Inventor: Changwoo Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 352 days.

(21) Appl. No.: 16/803,049

(22) Filed: Feb. 27, 2020

(65) Prior Publication Data

US 2021/0039269 A1 Feb. 11, 2021

(30) Foreign Application Priority Data

Aug. 9, 2019 (KR) .......................... 10-2019-0097352

(51) Int. Cl.
*B25J 19/00* (2006.01)
*F16H 7/02* (2006.01)
*B25J 18/00* (2006.01)
*B25J 9/10* (2006.01)
*F16H 19/08* (2006.01)
*B25J 17/00* (2006.01)
*B25J 17/02* (2006.01)

(52) U.S. Cl.
CPC .......... *B25J 19/0016* (2013.01); *B25J 9/1045* (2013.01); *B25J 18/00* (2013.01); *F16H 7/023* (2013.01); *F16H 19/08* (2013.01); *F16H 2019/085* (2013.01)

(58) Field of Classification Search
CPC ............................ B25J 9/1045; B25J 19/0016; F16H 2019/085
See application file for complete search history.

(56) References Cited

U.S. PATENT DOCUMENTS

| | | | | |
|---|---|---|---|---|
| 2,665,102 A | * | 1/1954 | Perbal .................... | F21V 21/26 248/584 |
| 4,445,184 A | * | 4/1984 | Noguchi ................. | B25J 9/046 414/730 |
| 5,538,214 A | * | 7/1996 | Sinila ..................... | F21V 21/26 248/278.1 |
| 2014/0202276 A1 | * | 7/2014 | Song ...................... | B25J 19/002 74/490.05 |

FOREIGN PATENT DOCUMENTS

KR        10-1790863 B1        10/2017

* cited by examiner

*Primary Examiner* — Jake Cook
(74) *Attorney, Agent, or Firm* — Birch, Stewart, Kolasch & Birch, LLP

(57) ABSTRACT

A robot arm including a rotating body connected to a base, an arm rotating about a central axis of the rotating body, a moving pulley provided at the arm and revolving along a circular track which is concentric with the rotating body, a reference pulley provided at the base and positioned on an inner side with respect to the circular track, a spring embedded in the arm and compressed or stretched in a lengthwise direction of the arm, a string compressing the spring and wound around the moving pulley and the reference pulley, and a plurality of roller bearings arranged to be spaced apart from each other along an outer circumference of the rotating body, rotating about a rotation axis parallel to the central axis of the rotating body, and configured to be in contact with the string is provided.

18 Claims, 18 Drawing Sheets

ROBOT ARM

CROSS-REFERENCE TO RELATED APPLICATIONS

This application claims the benefit of the Korean Patent Application No. 10-2019-0097352 filed on Aug. 9, 2019, which is hereby incorporated by reference as if fully set forth herein.

BACKGROUND

Field of the Disclosure

The present disclosure relates to a robot arm, and more particularly, to a robot arm including a gravity compensation mechanism.

Discussion of the Related Art

Recently, a variety of robots have been developed to facilitate a human living environment or to assist work in an industrial field.

In particular, robots are extensively applied not only for industrial use, such as painting, welding, or the like but also to the medical industry. Since these industrial articulated robot arms must transport and support heavy workpieces, it is very important for the robot arms to produce high torque.

Such articulated robot arm is subjected to load torque due to self-load or a weight of a workpiece, and the load torque directly affects designing capacity of a driver such as a drive motor. In particular, weight of a torque component generated by the self-load of the robot arm in the load acting on the drive motor is very high.

When determining the capacity of the driver of the robot arm, gravity torque generated by the self-load of the robot arm itself, as well as the torque generated by the workpiece, should be considered, and thus, capacity of a power source for driving the robot arm must be increased.

In a related art, a simple idea of a concept of compensating for gravity due to the self-load of the robot arm or the like by using a spring has been proposed, but in reality, there is a limitation in a mechanism to which the idea is practically applied.

RELATED ART DOCUMENT

Patent Document

KR 10-1790863 B1 (Registered on Oct. 20, 2017)

SUMMARY

An aspect of the present disclosure is directed to providing a robot arm having a gravity compensation mechanism for compensating for torque generated due to a self-load.

Another aspect of the present disclosure is directed to providing a robot arm which is not hindered by a gravity compensation mechanism.

Another aspect of the present disclosure is directed to providing a robot arm capable of compensating for a torque load based on a self-load of a second arm generated by rotation of a first arm.

To achieve these and other advantages and in accordance with the purpose of the disclosure, as embodied and broadly described herein, there is provided a robot arm including: a rotating body connected to a base; an arm rotating about a central axis of the rotating body; a moving pulley provided at the arm and revolving along a circular track which is concentric with the rotating body; a reference pulley provided at the base and positioned on an inner side with respect to the circular track; a spring embedded in the arm and compressed or stretched in a lengthwise direction of the arm; a string compressing the spring and wound around the moving pulley and the reference pulley; and a plurality of roller bearings arranged to be spaced apart from each other along an outer circumference of the rotating body, rotating about a rotation axis parallel to the central axis of the rotating body, and configured to be in contact with the string.

At least some of the plurality of roller bearings may include: a first roller; and a second roller spaced apart from the first roller in a direction of the rotation axis.

The first roller and the second roller may rotate in mutually opposite directions.

The first roller and the second roller may be positioned on the same side as and/or the opposite side of the spring with respect to a first virtual plane passing through the central axis of the rotating body and a central axis of the reference pulley.

The first roller and the second roller may be positioned on the same side as the spring with respect to a second virtual plane perpendicular to the first virtual plane and passing through the central axis of the rotating body.

The rotating body may include: a pair of large diameter portions spaced apart from each other in a direction of the central axis of the rotating body; and a small diameter portion connecting the pair of large diameter portions, and the plurality of roller bearings are positioned between the pair of large diameter portions and positioned outside the small diameter portion.

In another aspect of the present disclosure, there is provided a robot arm including: a first rotating body connected to a base; a first arm rotating about a central axis of the first rotating body; a first moving pulley provided in the first arm and revolving along a first circular track which is concentric with the first rotating body; a first reference pulley provided at the base and positioned on an inner side with respect to the first circular track; a second rotating body connected to an end portion of the first arm; a second arm rotating about a central axis of the second rotating body; a second moving pulley provided at the second arm and revolving along a second circular track which is concentric with the second rotating body; a second reference pulley provided at the second rotating body and positioned on an inner side with respect to the second circular track; a first spring and a second spring embedded in the first arm, compressed or stretched in a lengthwise direction of the first arm, and spaced apart from each other in parallel; a first string compressing the first spring and wound around the first moving pulley and the first reference pulley; a second string compressing the second spring and wound around the second moving pulley and the second reference pulley; a first timing gear rotating together with the first rotating body; a second timing gear rotating with respect to the second rotating body; and a timing belt transferring a rotational force of the first timing gear to the second timing gear, wherein the second reference pulley is connected to the second timing gear.

Diameters of the first timing gear and the second timing gear may be equal.

The second reference pulley may revolve along a third circular track having a diameter smaller than a diameter of the second circular track, and the second circular track may be concentric with the second rotating body.

The robot arm may further include: a plurality of roller bearings arranged to be spaced apart from each other along an outer circumference of the first rotating body, rotating about a rotation axis parallel to the central axis of the first rotating body, and configured to be in contact with the first string.

The robot arm may further include: a plurality of roller bearings arranged to be spaced apart from each other along an outer circumference of the second rotating body, rotating about a rotation axis parallel to the central axis of the second rotating body, and configured to be in contact with the second string.

At least some of the plurality of roller bearings may include: a first roller; and a second roller spaced apart from the first roller in a direction of the rotation axis.

The first roller and the second roller may rotate in mutually opposite directions.

At least some of the plurality of roller bearings may include: a first roller; and a second roller spaced apart from the first roller in a direction of the rotation axis, and the first roller and the second roller are positioned on the same side as and/or the opposite side of the first spring with respect to a first virtual plane passing through the central axis of the first rotating body and a central axis of the first reference pulley.

The first roller and the second roller may be positioned on the same side as the first spring with respect to a second virtual plane perpendicular to the first virtual plane and passing through the central axis of the first rotating body.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1:
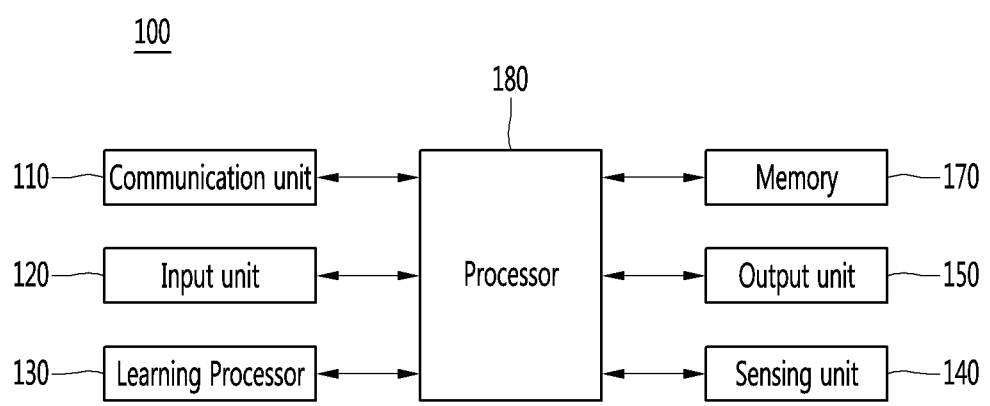
FIG. 1 illustrates an AI device including a robot according to an embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like portions.

With respect to constituent elements used in the following description, suffixes "module" and "unit" are given only in consideration of ease in the preparation of the specification, and do not have or serve as different meanings. Accordingly, the suffixes "module" and "unit" may be used interchangeably.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

FIG. 1 illustrates an AI device 100 including a robot according to an embodiment of the present disclosure.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
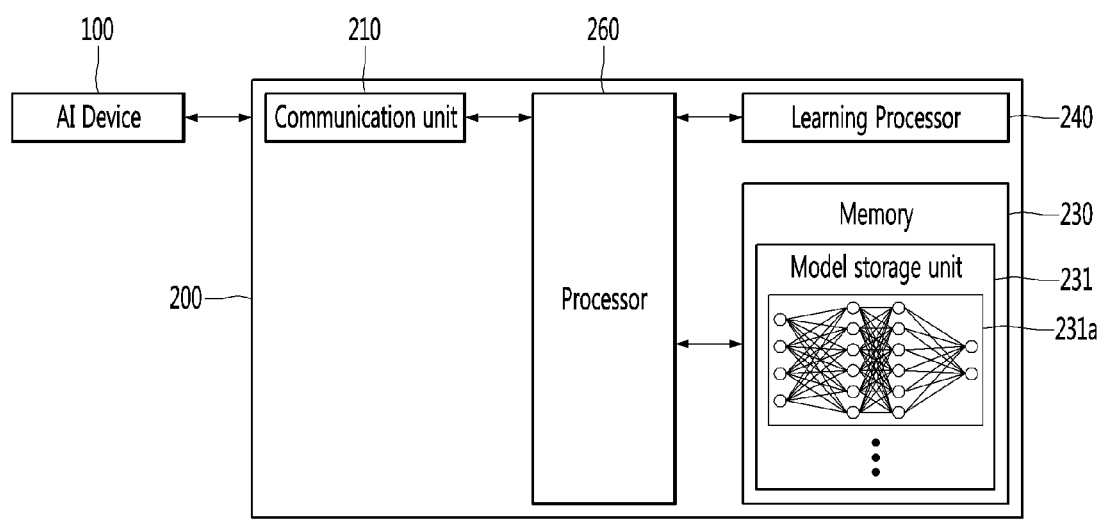
FIG. 2 illustrates an AI server connected to a robot according to an embodiment of the present disclosure.

FIG. 2 illustrates an AI server 200 connected to a robot according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
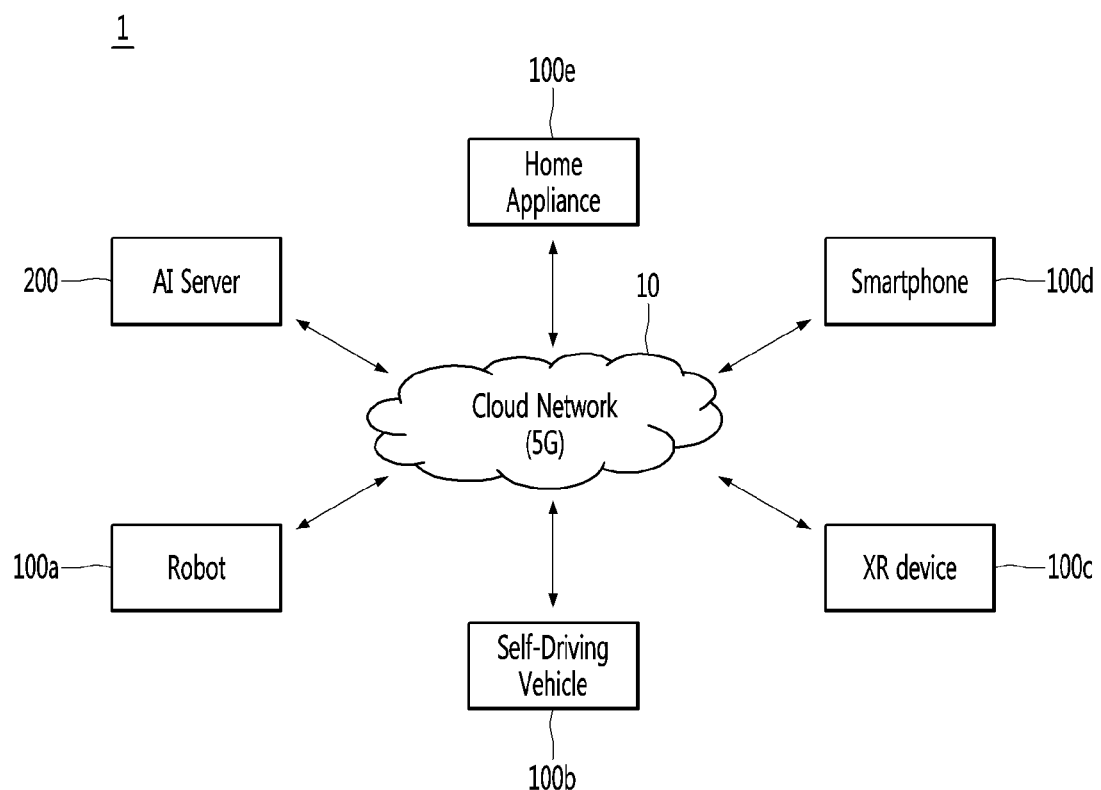
FIG. 3 illustrates an AI system according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

Figure 4:
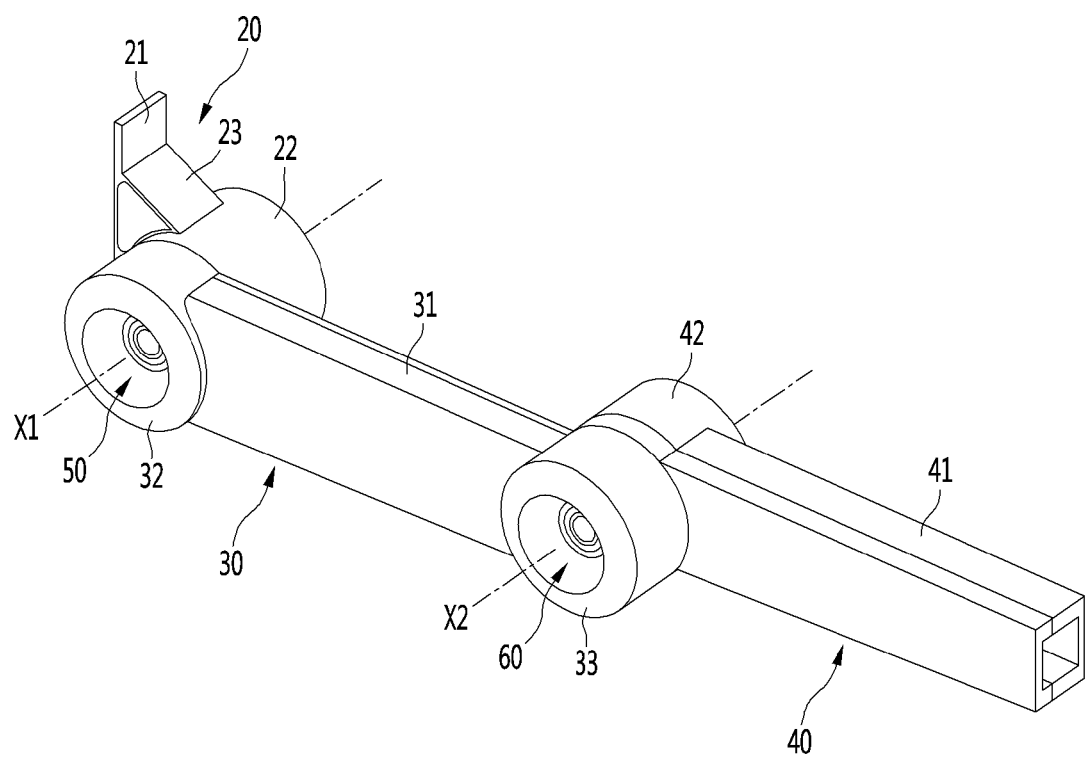
FIG. 4 is a perspective view showing an appearance of a robot arm according to an embodiment of the present disclosure.

FIG. 4 is a perspective view showing an appearance of a robot arm according to an embodiment of the present disclosure.

The robot arm according to an embodiment of the present disclosure may be a component included in the robot 100a.

The robot arm may include a base 20, a first rotating body 50 connected to the base 20, and a first arm 30 that rotates about a central axis X1 of the first rotating body 50. The robot arm may further include a second rotating body 60 connected to the first arm 30 and a second arm 40 rotating about a central axis X2 of the second rotating body 60.

The base 20 may include a fastening plate 21 fastened to a bottom surface or a structure, a base body 22 to which the first arm 30 is connected, and a connection portion 23 connecting the fastening portion 21 and the base body 22.

The fastening plate 21 may be fastened to a bottom surface, wall, structure, and the like by a fastening member such as a screw, thereby supporting the entire robot arm.

The base body 22 may have a hollow cylindrical shape. A motor for rotating the first arm 30 may be embedded in the base body 22.

The connection portion 23 may connect one surface of the fastening plate 21 and an outer circumference of the base body 22.

The first rotating body 50 may rotate about the central axis X1 with respect to the base 20. The first rotating body 50 may be connected to the motor embedded in the base 20, more specifically, in the base body 22.

The first arm 30 may be connected to the first rotating body 50 and rotate with the first rotating body 50. That is, the first arm 30 may rotate about the central axis X1 of the first rotating body 50 with respect to the base 20.

The first arm 30 may include a first arm body 31 extending in one direction, a first connection portion 32 provided at one end of the first arm body 31 and connected to the first rotating body 50, and a second connection portion 33 provided at the other end of the first arm body 31 and connected to the second rotating body 60.

The first arm body 31, the first connection portion 32, and the second connection portion 33 are preferably formed integrally.

The first connection portion 32 and the second connection portion 33 may be a hollow cylindrical shape.

The first connection portion 32 may be connected to the first rotating body 50 to rotate together with the first rotating body 50 with respect to the base 20. The first rotating body 50 may be mounted in the first connection portion 32.

The second connection portion 32 may be connected to the second rotating body 60 to rotate together with the second rotating body 60 with respect to the first arm 30. The second rotating body 60 may be mounted in the second connection portion 33.

The second rotating body 60 may rotate about the central axis X2 with respect to the first arm 30. The second rotating body 60 may be connected to a motor embedded in the second arm 40, more specifically, in the third connection portion 42 to be described in more detail later.

The central axis X2 of the second rotating body 60 may be parallel to the central axis X1 of the first rotating body 50.

The second arm 40 may be connected to the second rotating body 60 and rotate together with the second rotating body 60. That is, the second arm 40 may rotate about the central axis X2 of the second rotating body 60 with respect to the first arm 30.

The second arm 40 may include a second arm body 41 extending in one direction and a third connection portion 42 provided at one end of the second arm body 41 and connected to the second rotating body 60.

The second arm body 41 and the third connection portion 42 are preferably formed integrally.

The third connection portion 42 may be a hollow cylindrical shape. A motor for rotating the second arm 40 may be embedded in the third connection portion 42. The motor may be connected to the second rotating body 60 and may rotate together with the second rotating body 60 with respect to the first arm 30.

Figure 5:
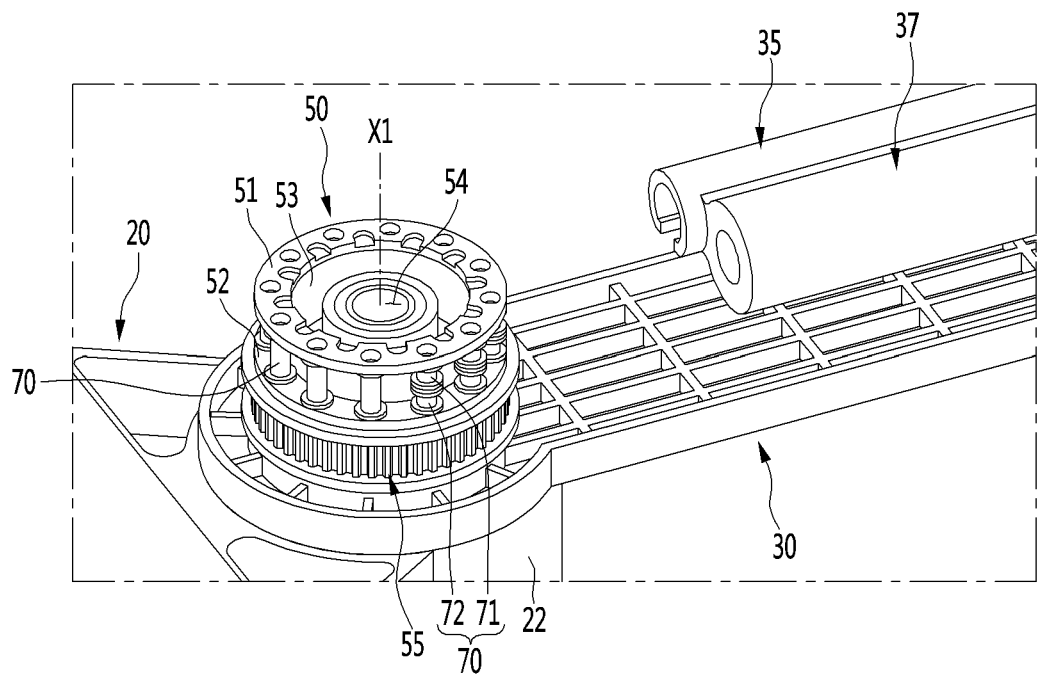
FIG. 5 is a view illustrating a configuration of a first rotating body according to an embodiment of the present disclosure.
Figure 6:
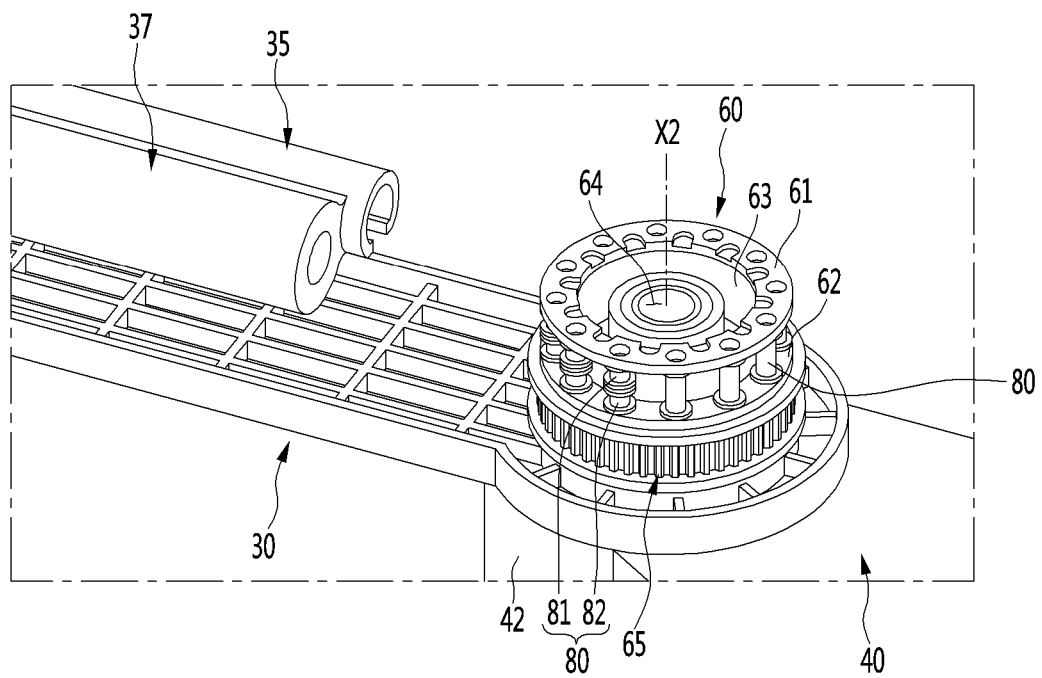
FIG. 6 is a view illustrating a configuration of a second rotating body according to an embodiment of the present disclosure.
Figure 7:
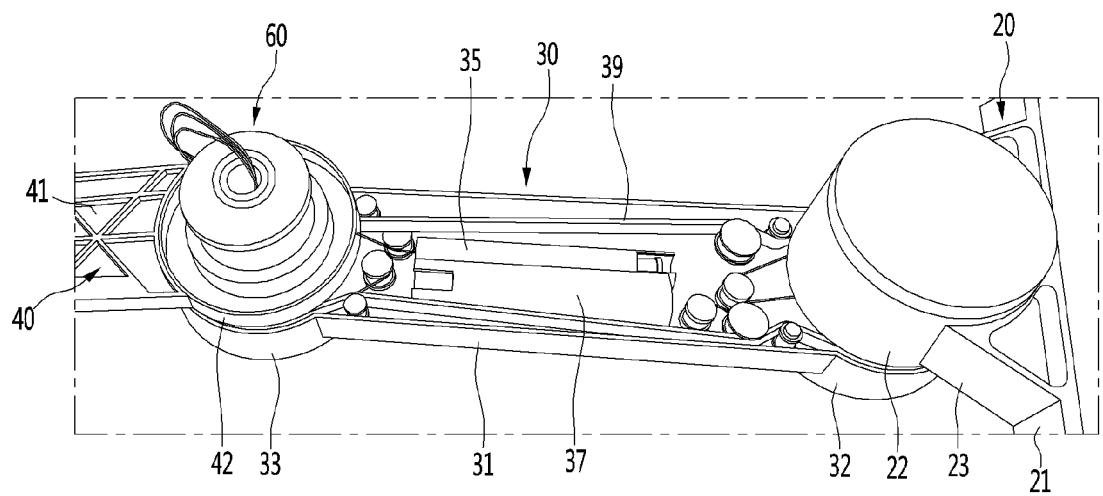
FIG. 7 is a view illustrating a timing belt according to an embodiment of the present disclosure.

FIG. 5 is a view illustrating a configuration of the first rotating body according to an embodiment of the present disclosure, FIG. 6 is a view illustrating a configuration of the second rotating body according to an embodiment of the present disclosure, and FIG. 7 is a view illustrating a timing belt according to an embodiment of the present disclosure.

The robot arm according to an embodiment of the present disclosure may include a plurality of roller bearings 70 and 80 spaced apart from each other along outer circumferences of the rotating bodies 50 and 60. The plurality of roller bearings 70 and 80 may be in contact with strings (windable members) 98 and 99 (see FIG. 8) to be described later and facilitate movement of the strings 98 and 99. As used herein, windable members includes strings, cords, ropes, cables, bands, wires or other long slender flexible materials.

Each of the roller bearings 70 and 80 may rotate in place with respect to the rotating bodies 50 and 60. Rotation axes of the roller bearings 70 and 80 may be parallel with the central axis X1 and X2 of the rotating bodies 50 and 60.

Specifically, the first rotating body 50 may include a pair of large diameter portions 51 and 52 spaced apart from each other and a small diameter portion 53 connecting the pair of large diameter portions 51 and 52. The roller bearing 70 provided in the first rotating body 50 may be positioned between the pair of large diameter portions 51 and 52 and positioned outside the small diameter part 53.

At least some of the plurality of roller bearings 70 provided in the first rotating body 50 may include a first roller 71 and a second roller 72 spaced apart from the first roller 71. A rotation axis of the first roller 71 and a rotation axis of the second roller 72 may be positioned in a straight line. The first roller 71 and the second roller 72 may rotate independently of each other.

The operation of the first roller 71 and the second roller 72 will be described in detail later.

The first rotating body 50 may have a hollow 54 penetrating in a direction of the central axis X1. The hollow 54 may penetrate through the pair of large diameter portions 51 and 52 and the small diameter portion 53.

The hollow 54 may communicate with the inside of the base body 22 of the base 20 connected to the first rotating body 50. A wire connected to the motor embedded in the base body 22 may pass through the hollow 54.

The second rotating body 60, similar to the first rotating body 50, may include a pair of large diameter portions 61 and 62 spaced apart from each other and a small diameter portion 63 connecting the pair of large diameter portions 61 and 62. The roller bearing 80 provided in the second rotating body 60 may be positioned between the pair of large diameter portions 61 and 62 and positioned outside the small diameter portion 63.

At least some of the plurality of roller bearings 80 provided in the first rotating body 60 may include a first roller 81 and a second roller 82 spaced apart from the first roller 81. A rotation axis of the first roller 81 and a rotation axis of the second roller 82 may be positioned in a straight line. The first roller 81 and the second roller 82 may rotate independently of each other.

The second rotating body 60 may have a hollow 64 penetrating in a direction of the central axis X2. The hollow 64 may penetrate through the pair of large diameter portions 61 and 62 and the small diameter portion 63.

The hollow 64 may communicate with the inside of the third connection portion 42 of the second arm 40 connected to the second rotating body 60. A wire connected to the motor embedded in the third connection portion 42 may pass through the hollow 64.

Meanwhile, the robot arm may further include a first timing gear 55, a second timing gear 65, and a timing belt 39.

The first timing gear 55 may be mounted in the first rotating body 50. The first timing gear 55 may be disposed to surround the large diameter portion 52 adjacent to the base 20, among the pair of large diameter portions 51 and 52 of the first rotating body 50.

The second timing gear 65 may be mounted in the second rotating body 60. The second timing gear 65 may be disposed to surround the large diameter portion 62 adjacent to the second arm 40, among the pair of large diameter portions 61 and 62 of the second rotating body 60.

The first timing gear 55 may rotate about the central axis X1 of the first rotating body 50 together with the first rotating body 50. Meanwhile, the second timing gear 65 may rotate about the central axis X2 of the second rotating body 60 with respect to the second rotating body 60. That is, the second timing gear 65 may not rotate together with the second rotating body 60.

The timing belt 39 may connect the first timing gear 55 and the second timing gear 65. The timing belt 39 may transmit a rotational force of the first timing gear 55 to the second timing gear 65.

Diameters of the first timing gear 55 and the second timing gear 65 may be equal. Therefore, rotation angles of the first timing gear 55 and the second timing gear 65 connected by the timing belt 39 may be equal.

The timing belt 39 may be disposed in the first arm 30. The timing belt 39 may have a loop shape. One side of an inner circumference of the timing belt 39 may be connected to and surround an outer circumference of the first timing gear 55, and the other side of the inner circumference of the timing belt 39 may be connected to and surround the outer circumference of the second timing gear 65.

The configuration of the timing belt 39 is not limited. For example, the timing belt 39 may be either a rubber belt or a metal chain.

As such, when the first rotating body 50 and the first timing gear 55 rotate together, the second timing gear 65 may rotate relative to the second rotating body 60 by the timing belt 39.

Figure 8:
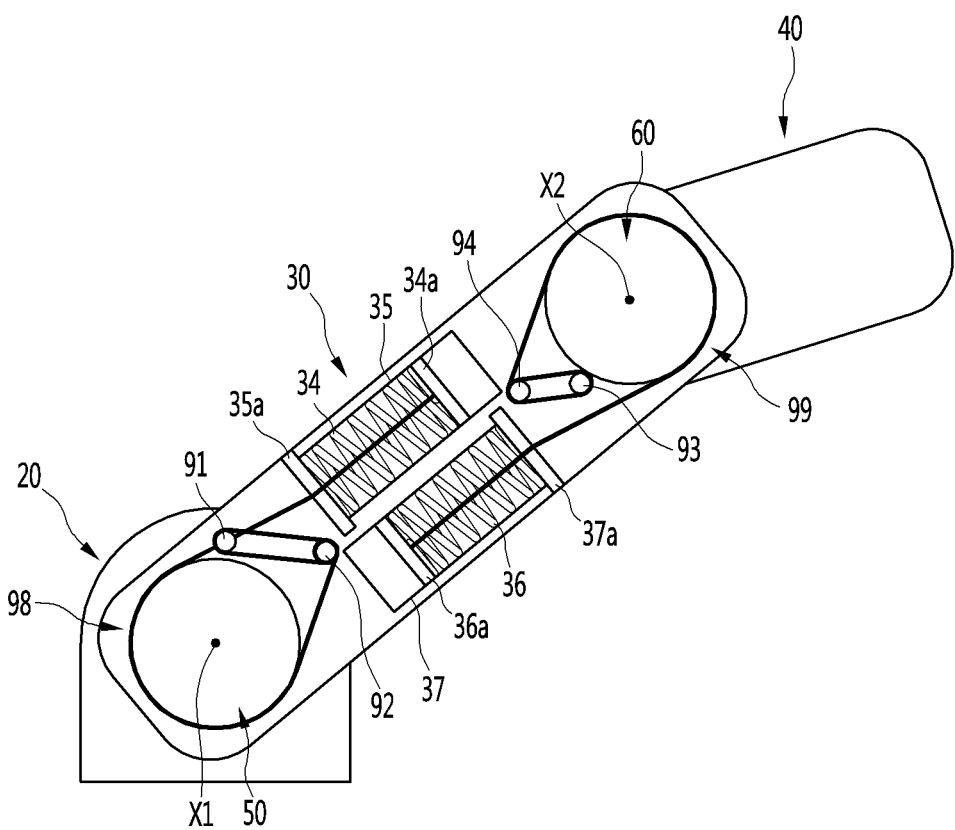
FIG. 8 is a schematic diagram showing an inside of a robot arm according to an embodiment of the present disclosure.

FIG. 8 is a schematic diagram showing an inside of a robot arm according to an embodiment of the present disclosure.

The robot arm according to an embodiment of the present disclosure may include a first gravity compensation mechanism for compensating for a torque load generated due to a self-load of the first arm 30 and a second gravity compensation mechanism for compensating for a torque load generated due to a self-load of the second arm 40.

The first gravity compensation mechanism may include a first reference pulley 91, a first moving pulley 92, a first spring 34, and a first string 98.

The first reference pulley 91 may be provided at the base 20. The first reference pulley 91 may rotate in place or may be fixed with respect to the base 20. That is, the first reference pulley 91 may not move according to rotation of the first arm 30.

The first moving pulley 92 may be provided at the first arm 30. The first moving pulley 92 may rotate in place or may be fixed with respect to the first arm 30. In addition, the first moving pulley 92 may move in a circumferential direction of the first rotating body 50 according to rotation of the first arm 30.

A distance between the first reference pulley 91 and an outer circumference of the first rotating body 50 may be shorter than a distance between the first moving pulley 92 and the outer circumference of the first rotating body 50.

That is, the first reference pulley 91 may be positioned on an inner side with respect to a first circular track C1 (see FIGS. 9A to 9D) to which the first moving pulley 92 moves. Specifically, the first reference pulley 91 may be positioned between the first circular track C1 and the outer circumference of the first rotating body 50.

The first spring 34 may be embedded in the first arm 30 and compressed or stretched in a lengthwise direction of the first arm 30.

Specifically, a first spring guide 35 disposed to extend in the lengthwise direction of the first arm 30 may be provided in the first arm 30. The first spring 34 may extend in the first spring guide 35.

One of both ends of the first spring guide 35 facing the first rotating body 50 may be open and may be covered by a first cover 35a. An opening through which the first string 98 passes may be formed at the first cover 35a.

A first pressing portion 34a moving in a lengthwise direction of the first spring guide 35 may be provided in the first spring guide 35. The first spring 34 may be compressed or stretched between the first pressing portion 34a and the first cover 35a.

The first string 98 may be connected to the first pressing portion 34a and may pull the first pressing portion 34a. When the first string 98 pulls the first pressing portion 34a, the first pressing portion 34a may compress the first spring

34. The first pressing portion 34*a* may move until tension of the first string 98 and a restoring force of the first spring 34 are balanced.

The first string 98 may be wound around the first rotating body 50, the first moving pulley 92, and the first reference pulley 91 and may be tightly maintained in tension.

Meanwhile, the second gravity compensation mechanism may include a second reference pulley 93, a second moving pulley 94, a second spring 36, and a second string 99.

The second reference pulley 93 may be provided at the second timing gear 65 described above. The second reference pulley 93 may rotate in place or may be fixed with respect to the second timing gear 65. In addition, the second reference pulley 92 may move in the circumferential direction of the second rotating body 60 according to rotation of the second timing gear 65.

The second moving pulley 94 may be provided at the second arm 40. The second moving pulley 94 may rotate in place or may be fixed with respect to the second arm 40. In addition, the second moving pulley 94 may revolve around the second rotating body 50 according to rotation of the second arm 40.

A distance between the second reference pulley 93 and an outer circumference of the second rotating body 60 may be shorter than a distance between the second moving pulley 94 and an outer circumference of the second rotating body 60.

That is, the second reference pulley 93 may be positioned on an inner side with respect to a second circular track C2 (see FIGS. 12A to 12C) to which the second moving pulley 94 moves. Specifically, the second reference pulley 93 may be positioned between the second circular track C2 and the outer circumference of the second rotating body 60.

The second spring 36 may be embedded in the first arm 30 and compressed or stretched in the lengthwise direction of the first arm 30. That is, the second spring 36 and the first spring 34 may be arranged side by side. The first spring 34 and the second spring 36 may be positioned on the mutually opposite sides with respect to a virtual plane including a central axis X1 of the first rotating body 50 and a central axis X2 of the second rotating body 60.

A second spring guide 37 extending in the lengthwise direction of the first arm 30 may be provided in the first arm 30. The second spring 36 may extend in the second spring guide 37.

One of both ends of the second spring guide 37 facing the second rotating body 60 may be open and may be covered by a second cover 37*a*. An opening through which the second string 99 passes may be formed at the second cover 37*a*.

A second pressing portion 36*a* moving in a lengthwise direction of the second spring guide 37 may be provided in the second spring guide 37. The second spring 36 may be compressed or stretched between the second pressing portion 36*a* and the second cover 37*a*.

The second string 99 may be connected to the second pressing portion 36*a* and may pull the second pressing portion 36*a*. When the second string 99 pulls the second pressing portion 36*a*, the second pressing portion 36*a* may compress the second spring 36. The second pressing portion 36*a* may move until tension of the second string 99 and a restoring force of the second spring 36 are balanced.

The second string 99 may be wound around the second rotating body 60, the second moving pulley 94, and the second reference pulley 93, and tightly maintained in tension.

Figure 9A:
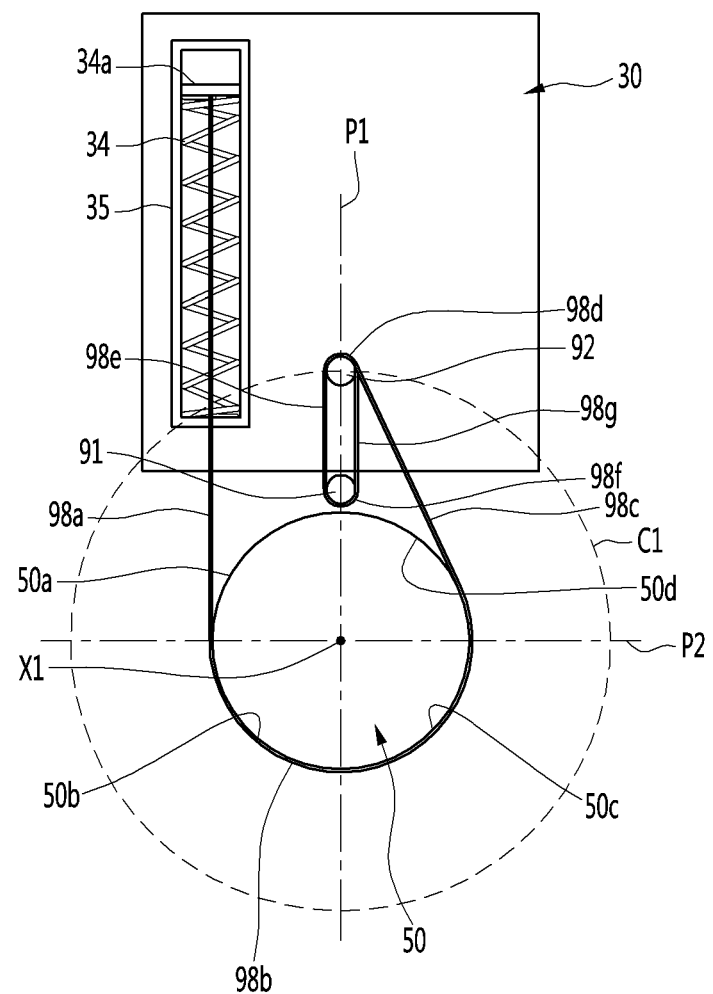
FIGS. 9A to 9D are diagrams illustrating rotation of a first arm in one direction with respect to a base according to an embodiment of the present disclosure.
Figure 9B:
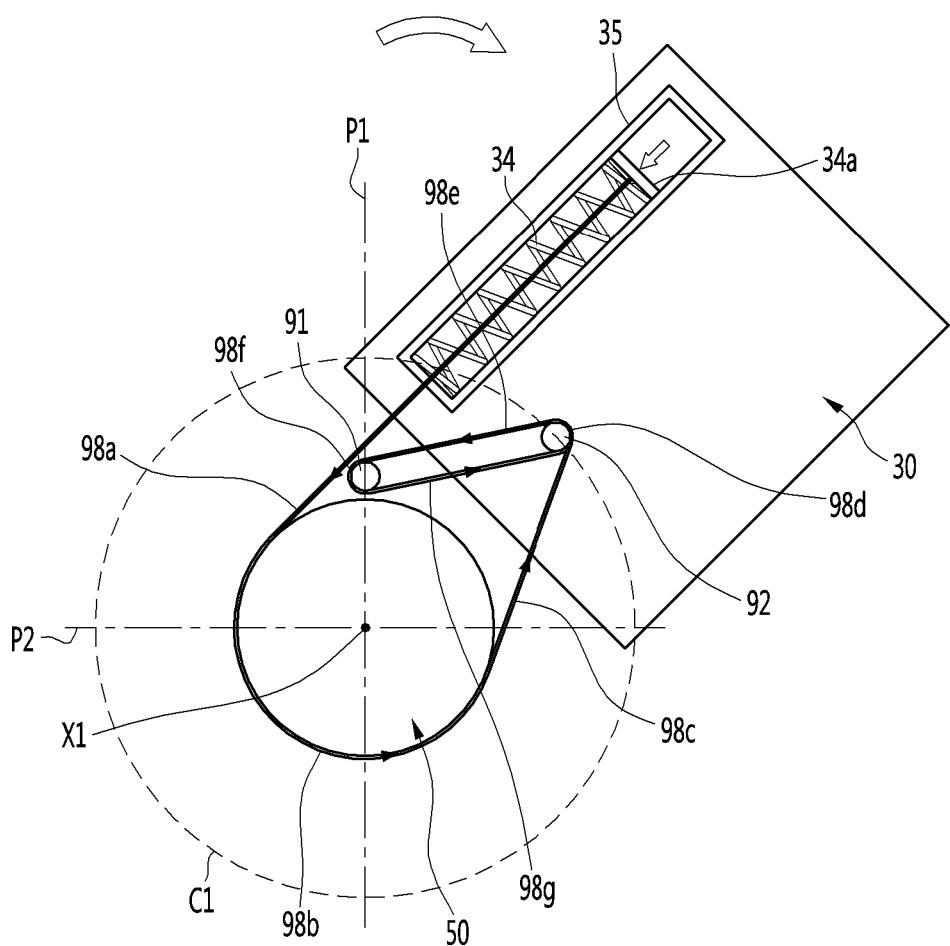
Figure 9C:
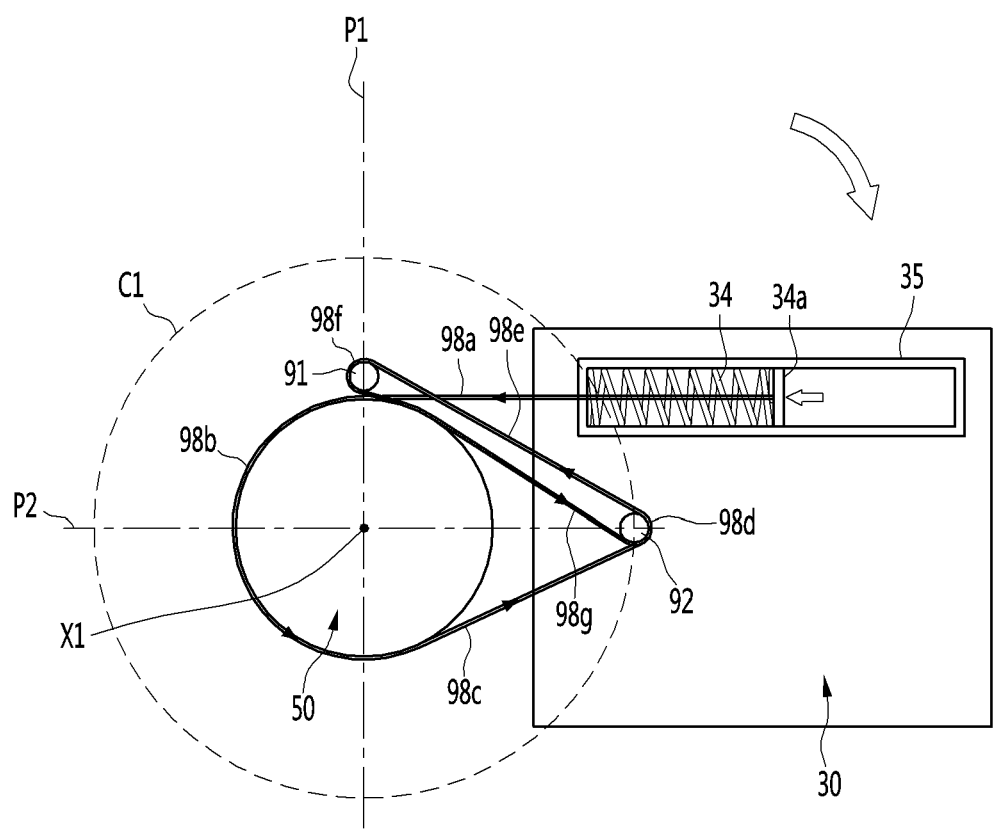
Figure 9D:
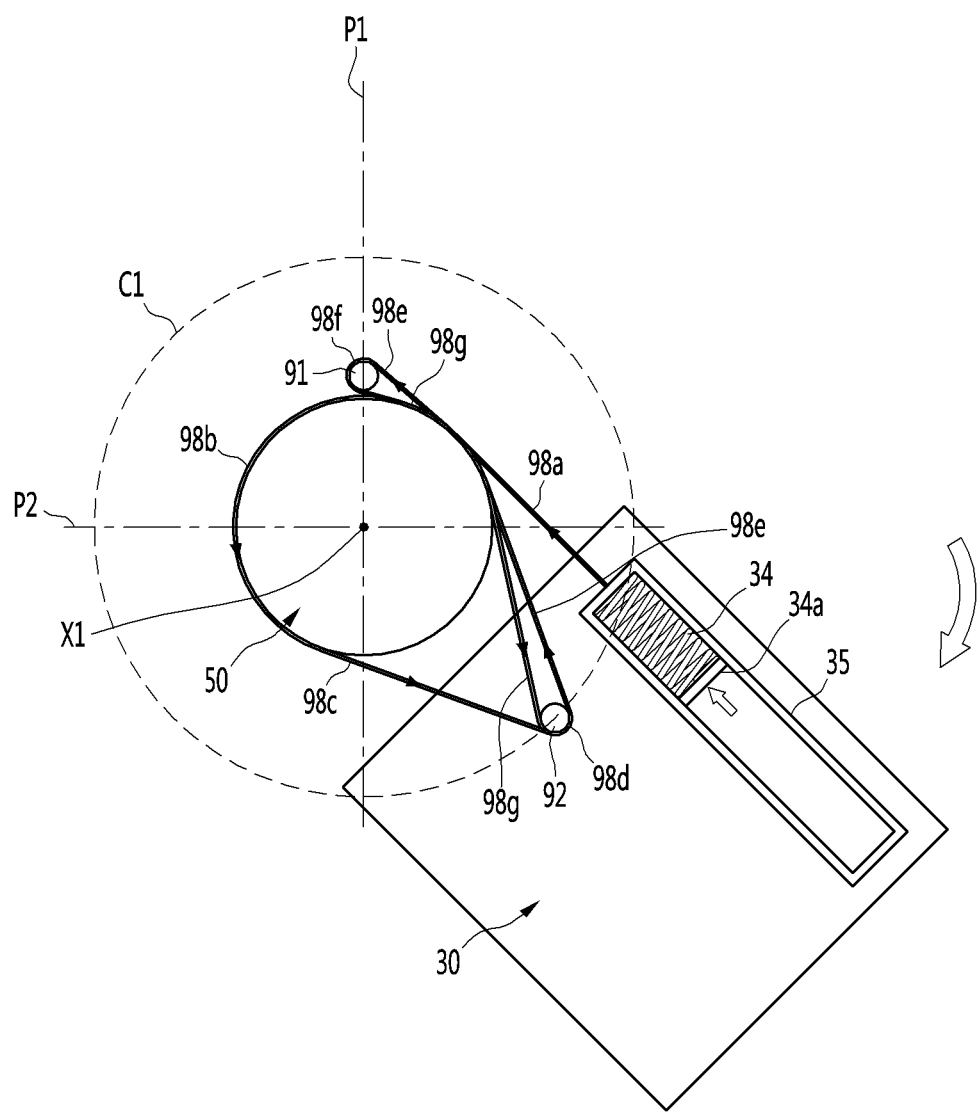
Figure 10:
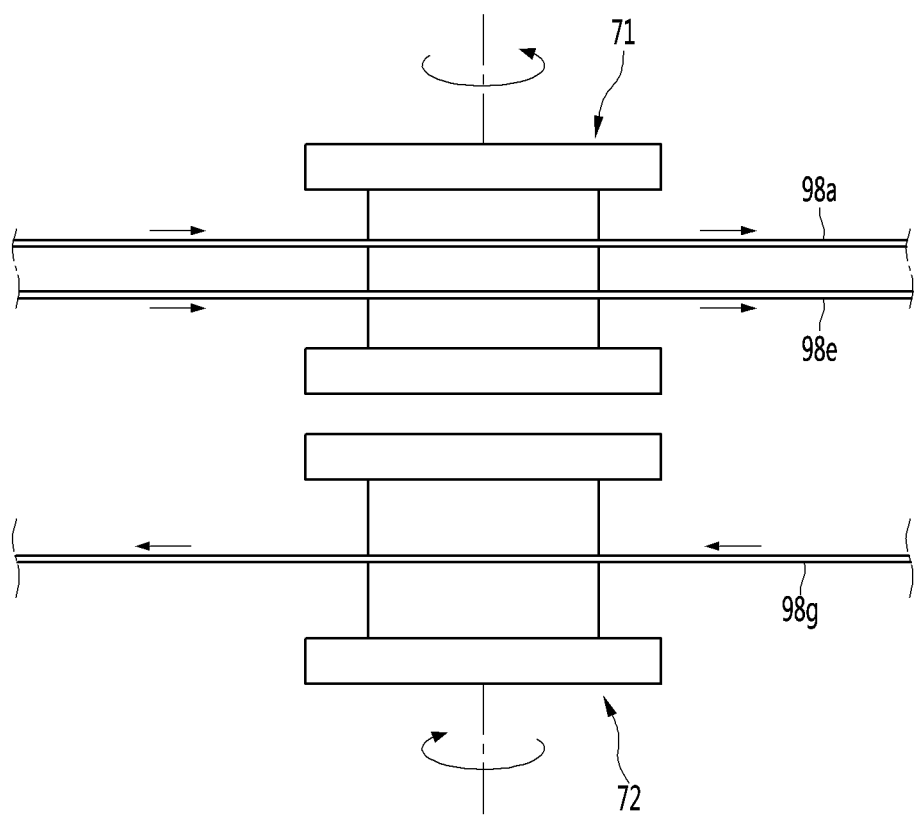
FIG. 10 is a view illustrating an operation of a first roller and a second roller according to an embodiment of the present disclosure.

FIGS. 9A to 9D are views illustrating rotation of the first arm in one direction with respect to a base according to the embodiment of the present disclosure, and FIG. 10 is a view illustrating operations of first roller and the second roller according to an embodiment of the present disclosure.

Referring to FIG. 9A, a first part 98*a* to seventh part 98*g* of the first string 98 may be defined according to positions thereof.

Specifically, the first part 98*a* may be connected to the first pressing portion 34*a* and extend to the first rotating body 50. The second part 98*b* may extend from the first part 98*a* and be wound around the first rotating body 50. The third part 98*c* may extend from the second part 98*b* to the first moving pulley 92. The fourth part 98*d* may extend from the third part 98*c* and be wound around the first moving pulley 92. The fifth part 98*e* may extend from the fourth part 98*d* to the first reference pulley 91. The sixth part 98*f* may extend from the fifth part 98*e* and be wound around the first reference pulley 91. The seventh part 98*g* may extend from the sixth part 98*f* to the first moving pulley 92.

The seventh part 98*g* may be constrained to the fourth part 98*d* with respect to a lengthwise direction of the seventh part 98*g*. That is, the fourth part 98*d* to the seventh part 98*g* may form a loop surrounding the first reference pulley 91 and the first moving pulley 92.

As the first arm 30 rotates, the first moving pulley 92 provided in the first arm 30 may move along the first circular track C1. The first circular track C1 may be concentric with the first rotating body 50. A diameter of the first circular track C1 may be larger than a diameter of the first rotating body 50.

Since the first moving pulley 92 moves along the first circular track C1, the first moving pulley 92 may become away from the first reference pulley 91. Accordingly, lengths of the fifth part 98*e* and the seventh part 98*g* of the first string 98 may be increased and lengths of the remaining parts may be decreased. That is, the first string 98 may compress the first spring 34.

As a result, a torque load due to a self-load of the first arm 30 may be compensated by an elastic force of the first spring 34. The action of the gravity compensation mechanism itself is a well-known art, and thus, a detailed description thereof will be omitted.

Meanwhile, a first virtual plane P1 passing through the central axis X1 of the rotating body 50 and the central axis of the first reference pulley 91 may be defined. In addition, a second virtual plane P2 perpendicular to the first virtual plane P1 and passing through the central axis X1 of the first rotating body 50 may be defined.

The outer circumference of the first rotating body 50 may be defined by a first section 50*a* to a fourth section 50*d* partitioned by the first virtual plane P1 and the second virtual plane P2.

The first section 50*a* may be positioned on the same side as the first spring 34 with respect to the first virtual plane P1 and the second virtual plane P2. The second section 50*b* may be positioned opposite to the first section 50*a* with respect to the second virtual plane P2. The third section 50*c* may be positioned opposite to the second section 50*b* with respect to the first virtual plane P1. The fourth section 50*d* may be positioned opposite to the third section 50*c* with respect to the second virtual plane P2 and may be positioned opposite to the first section 50*a* with respect to the first virtual plane P1.

As described above, a plurality of roller bearings 70 (see FIG. 5) may be provided on the outer circumference of the first rotating body 50, and at least some of the plurality of roller bearings 70 may include a first roller 71 and a second roller 72.

Specifically, the first roller 71 and the second roller 72 may be positioned in the fourth section 50*d* of the outer circumference of the first rotating body 50. That is, the first roller 71 and the second roller 72 may be positioned opposite to the first spring 34 with respect to the first virtual plane P1 and may be positioned on the same side as the first spring with respect to the second virtual plane P2.

Of course, the first roller 71 and the second roller 72 may be positioned on the first virtual plane P1 and/or the second virtual plane P2.

Hereinafter, the operations of the first roller 71 and the second roller 72 will be described.

FIGS. 9B to 9D illustrate a state in which the first arm 30 rotates in one direction. The one direction may refer to a direction in which the first spring 34 passes through the first virtual plane P1.

As shown in FIG. 9B, if an angle formed by the first reference pulley 91 and the first moving pulley 92 with reference to the central axis X1 of the first rotating body 50 is less than 90°, a case where different parts of the first string 98 are in contact with the same point of the outer circumference of the first rotating body 50 does not occur.

Meanwhile, as shown in FIGS. 9C and 9D, if the angle formed by the first reference pulley 91 and the first moving pulley 92 with reference to the central axis X1 of the first rotating body 50 is equal to or greater than 90°, different parts of the first string 98 may be in contact with the same point of the outer circumference of the first rotating body 50. In this case, it is apparent that the point where the different part of the first string 98 are in contact with each other is the fourth section 50*d* of the outer circumference of the first rotating body 50.

Specifically, FIG. 9C shows a state where the first part 98*a* and the seventh part 98*g* are in contact with the same point of the fourth section 50*d* of the outer circumference of the first rotating body 50. That is, the first part 98*a* and the seventh part 98*g* may be in contact with the same roller bearing 70 (see FIG. 5).

As described above, the roller bearing 70 positioned in the fourth section 50*d* may include the first roller 71 and the second roller 72. One of the first part 98*a* and the seventh part 98*g* may be in contact with the first roller 71 and the other may be in contact with the second roller 72.

Since the first part 98*a* and the seventh part 98*g* move in mutually opposite directions, the first roller 71 and the second roller 72 may rotate in the mutually opposite directions. If the first part 98*a* and the seventh part 98*g* are in contact with the integral roller bearing 70, the roller bearing 70 cannot rotate and smooth movement of the first string 98 may be hindered.

In addition, FIG. 9D shows a configuration in which the first part 98*a*, the fifth part 98*e*, and the seventh part 98*g* are in contact with the same point of the fourth section 50*d* of the outer circumference of the first rotating body 50. That is, the first part 98*a*, the fifth part 98*e*, and the seventh part 98*g* may be in contact with the same roller bearing 70 (see FIG. 5).

In this case, as shown in FIG. 10, the first part 98*a* and the fifth part 98*e* are in contact with the first roller 71 and the seventh part 98*g* is may be in contact with the second roller 72. It may also be configured such that the first part 98*a* and the fifth part 98*e* is in contact with the second roller 72 and the seventh part 98*g* is in contact with the first roller 71.

Since the first part 98*a* and the fifth part 98*e* move in one direction and the seventh part move in the other direction, the first roller 71 and the second roller 72 may rotate in mutually opposite directions. If the first part 98*a*, the fifth part 98*e*, and the seventh part 98*g* are in contact with the integral roller bearing 70, the roller bearing 70 may not rotate and smooth movement of the first string 98 may be hindered.

Figure 11A:
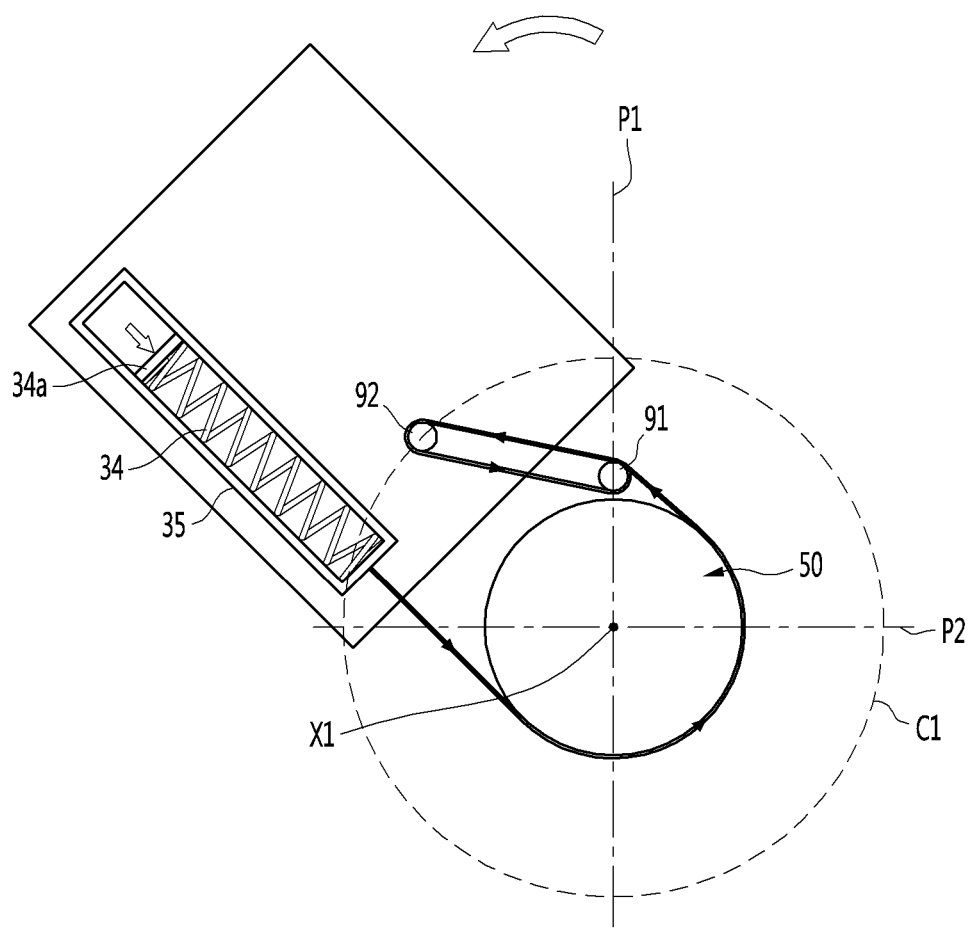
FIGS. 11A and 11B are views illustrating rotation of a first arm in the other direction with respect to a base according to an embodiment of the present disclosure.
Figure 11B:
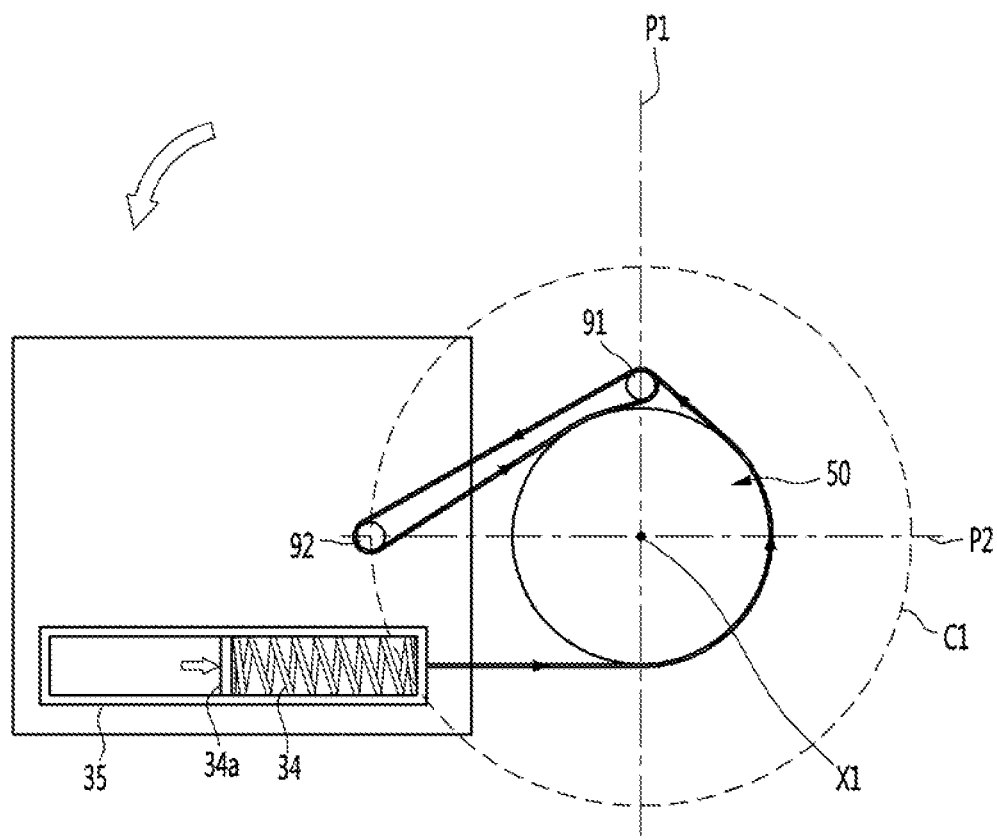

FIGS. 11A and 11B are views illustrating rotation the first arm in the other direction with respect to the base according to an embodiment of the present disclosure.

FIGS. 11A and 11B illustrate a state in which the first arm 30 rotates in the other direction. The other direction may refer to a direction in which the first spring 34 becomes away from the first virtual plane P1.

As illustrated in FIGS. 11A and 11B, when the first arm 30 rotates in the other direction, a phenomenon that different parts of the first string 98 are in contact with the same point of the outer circumference of the first rotating body 50 is minimized.

In the state shown in FIG. 11B, when the first arm 30 further rotates in the other direction, the fifth part 98*e* and the seventh part 98*f* may be in contact with the same point of the first section 50*a* of the first rotating body 50. In this case, the roller bearing 70 (see FIG. 5) disposed in the first section 50*a* may include the first roller 71 and the second roller 72. That is, the first roller 71 and the second roller 72 may be positioned on the same side of the first spring 34 with respect to the first virtual plane P1 and the second virtual plane P2.

Figure 12A:
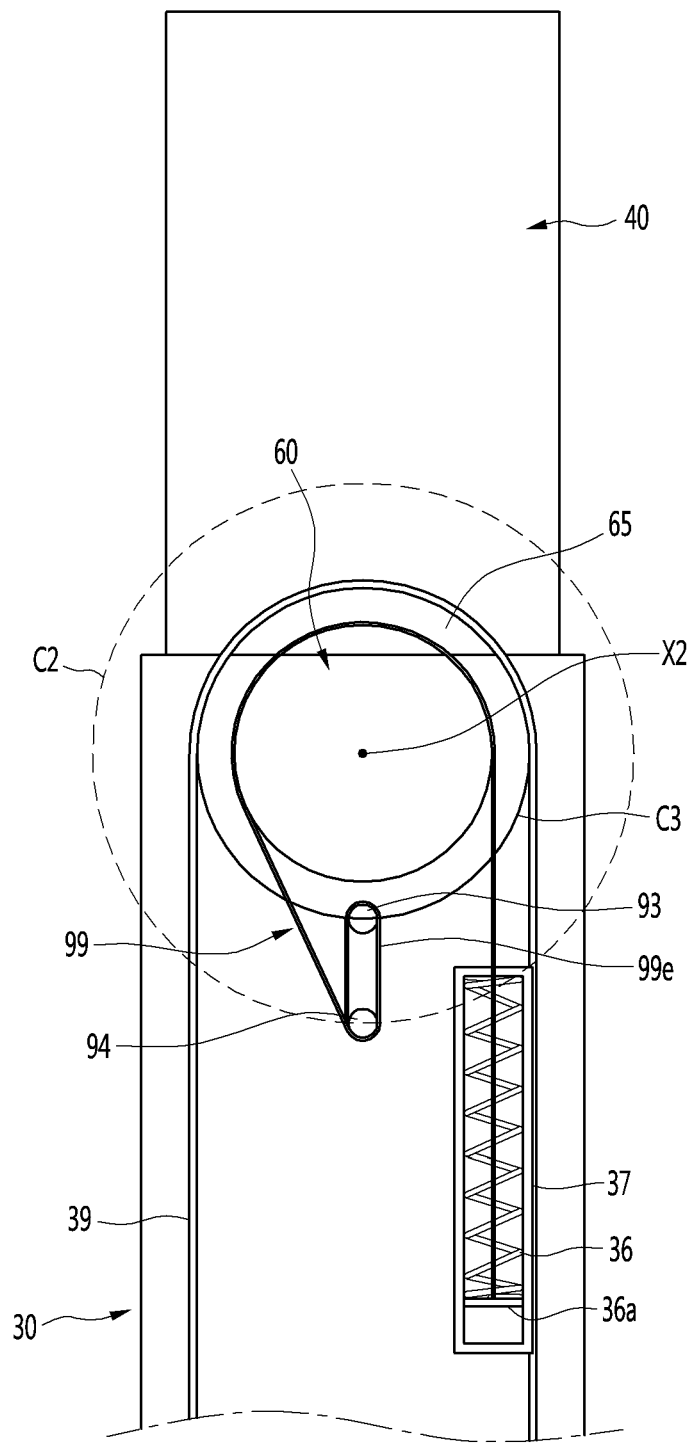
FIGS. 12A to 12C are diagrams illustrating rotation of a second arm with respect to a first arm according to an embodiment of the present disclosure.
Figure 12B:
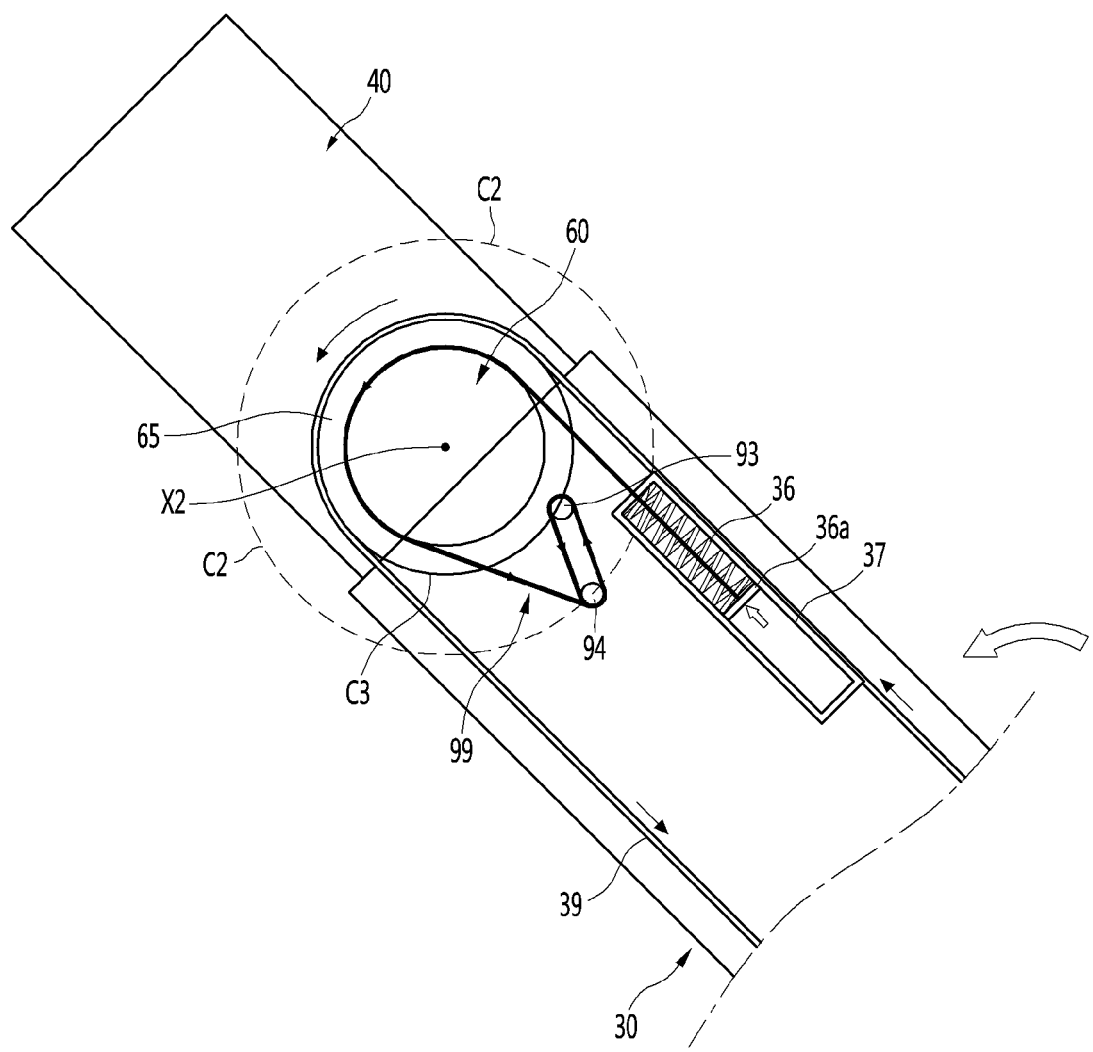
Figure 12C:
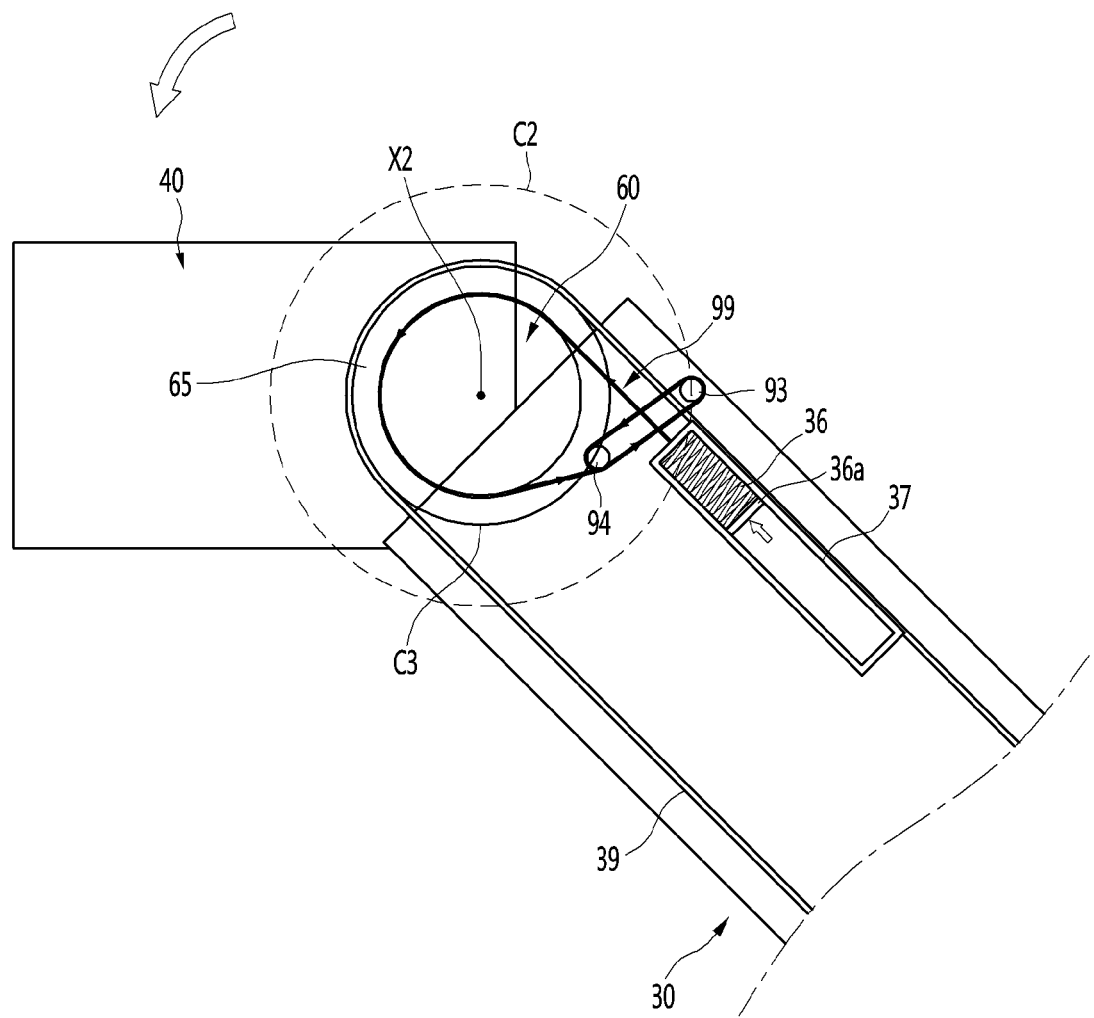

FIGS. 12A to 12C are views illustrating rotation of a second arm with respect to a first arm according to an embodiment of the present disclosure.

In the second string 99, similar to the first string 98 described above, first part 99*a* to seventh part 99*g* may be defined according to positions thereof.

Specifically, the first part 99*a* may be connected to the second pressing portion 36*a* and extend to the second rotating body 60. The second part 99*b* may extend from the first part 99*a* and be wound around the second rotating body 60. The third part 99*c* may extend from the second part 99*b* to the second moving pulley 94. The fourth part 99*d* may extend from the third part 99*c* and be wound around the second moving pulley 94. The fifth part 99*e* may extend from the fourth part 99*d* to the second reference pulley 93. The sixth part 99*f* may extend from the fifth part 99*e* and be wound around the second reference pulley 93. The seventh part 99*g* may extend from the sixth part 99*f* to the second moving pulley 94.

The seventh part 99*g* may be constrained to the fourth part 99*d* with respect to a lengthwise direction of the seventh part 99*g*. That is, the fourth part 99*d* to the seventh part 99*g* may form a loop surrounding the second reference pulley 93 and the second moving pulley 93.

FIG. 12C shows a state in which the second arm 40 rotates with respect to the first arm 30.

The second moving pulley 94 provided at the second arm 40 may move along a second circular track C2 according to rotation of the second arm 40 with respect to the first arm 20. The second circular track C2 may be concentric with the second rotating body 60. A diameter of the second circular track C2 may be larger than a diameter of the second rotating body 60.

Since the second moving pulley 94 moves along the second circular track C2, the second moving pulley 94 may become away from the second reference pulley 93. Accordingly, lengths of the fifth part 99*e* and the seventh part 99*g* may be increased and lengths of the remaining parts may be decreased. That is, the second string 99 may pull the second pressing portion 36*a* to compress the second spring 36. As a result, a torque load due to a self-load of the second arm 40 may be compensated by an elastic force of the second spring 36.

Meanwhile, when the first arm 30 rotates relative to the base 20, even if the second arm 40 does not rotate relative to the first arm 30, a torque load acting on the second arms 40 may be varied due to a self-load of the second arm 40. Therefore, it is preferable to correct a variable amount of the torque load based on the rotation of the first arm 30 in relation to gravity compensation of the second spring 36. To this end, the position of the second reference pulley 93 may be varied by the rotation of the first arm 30.

As described above, the second reference pulley 93 may be provided in the second timing gear 65. The first timing gear 55 may rotate together with the first arm 30 and the second timing gear 65 may receive a rotational force of the first timing gear 55 by the timing belt 39.

Thus, the second timing gear 65 may rotate relative to the second rotating body 60 and the second reference pulley 93 may move along the circumference of the second rotating body 60.

That is, the second reference pulley 93 may move along a third circular track C3 according to the rotation of the first arm 30. The third circular track C3 may be concentric with the second rotating body 50. A diameter of the third circular track C3 may be smaller than the second circular track C2. The diameter of the third circular track C3 may be greater than or equal to the diameter of the second rotating body 60.

FIG. 12B shows a state that the first arm 30 rotates about the base 20 (see FIG. 8) and the second arm 40 does not rotate relative to the first arm 30.

When the first arm 30 rotates, the second timing gear 65 may be rotated by the timing belt 39 and the second reference pulley 93 may move along the third circular track C3, and thus, a distance between the second moving pulley 94 and the second reference pulley 93 may be increased. Accordingly, lengths of the fifth part 99e and the seventh part 99g of the second string 99 may be increased and lengths of the remaining parts may be decreased. That is, the second string 99 may compress the second spring 36.

As a result, the torque load due to the self-load of the second arm 40 may be compensated by an elastic force of the second spring 36.

Meanwhile, when the second arm 40 further rotates with respect to the first arm 30 in the state shown in FIG. 12C, the fifth part 99e and the seventh part 99f may be in contact with the same point of the outer circumference of the second rotating body 60. In this case, the roller bearing 80 (refer to FIG. 6) in contact with the fifth part 99e and the seventh part 99f of the second string 99 may include the first roller 81 and the second roller 82. Operations of the first roller 81 and the second roller 82 are the same as those described, and thus, a description thereof will be omitted.

It will be apparent to those skilled in the art that various modifications and variations may be made in the present disclosure without departing from the spirit or scope of the disclosures. Thus, it is intended that the present disclosure covers the modifications and variations of this disclosure provided they come within the scope of the appended claims and their equivalents.

According to the embodiment of the present disclosure, since the distance between the reference pulley and the rotating pulley is increased according to rotation of the arm and the string compresses the spring, a torque load based on the self-load of the arm may be compensated by elastic force of the spring, and thus, the torque load may be reduced.

In addition, since the string is in contact with a plurality of roller bearings disposed on the outer circumference of the rotating body, rotation of the rotating body may not be disturbed by the movement of the string. Therefore, the operation may not be disturbed by the gravity compensation mechanism.

In addition, at least some of the plurality of roller bearings may include the first roller and the second roller spaced apart from each other in the direction of the rotation axis. Therefore, different portions of the string positioned at the same point of the outer circumference of the rotating body may be in contact with the first roller and the second roller, respectively. Accordingly, even if the different portions of the string are moved in the opposite directions, actuation may not be disturbed by the gravity compensation mechanism.

Further, with respect to the first virtual plane passing through the central axis of the rotating body and the central axis of the reference pulley, the first roller and the second roller may be positioned on the same side as and/or the opposite side of the spring. Therefore, even if the arm rotates in any direction, actuation may not be disturbed by the gravity compensation mechanism.

In addition, with respect to the second virtual plane which is perpendicular to the first virtual plane and passes through the central axis of the rotating body may be positioned on the same side as the spring. This prevents the first roller and the second roller from being disposed even at an unnecessary point, thereby reducing manufacturing cost.

In addition, a rotational force of the first timing gear that rotates together with the first rotating body may be transmitted to the second timing gear by the timing belt, the second timing gear may rotate relative to the second rotating body, and the second reference pulley may be connected to the second timing gear. Accordingly, when the first arm rotates about the base, a torque load acting on the second arm due to the self-load of the second arm may be compensated.

What is claimed is:

1. A robot arm comprising:
  a base;
  a first rotatable body located at the base, the first rotatable body defining a first central axis;
  a first arm rotatable about the first central axis of the first rotatable body;
  a first moving pulley located at the first arm, the first moving pulley arranged to revolve along a first circular track which is concentric with the first central axis;
  a first reference pulley located at the base, the first reference pulley being located between the first central axis and the first circular track;
  a first spring located in the first arm, the first spring being compressible and stretchable along a first longitudinal axis of the first arm;
  a first windable member having a first end connected to the first spring and a second end connected to one of the first reference pulley or the first moving pulley, the first windable member being configured to compress the first spring as the first windable member is wound around the first moving pulley and the first reference pulley; and
  a plurality of first roller bearings arranged to be spaced apart from each other along an outer circumference of the first rotatable body, each first roller bearing being configured to rotate about a first rotation axis parallel to the first central axis of the first rotatable body, each first roller bearing being contactable with the first windable member.

2. The robot arm of claim 1, wherein at least two of the plurality of first roller bearings comprise:
a first roller; and
a second roller spaced apart from the first roller in a direction of the first rotation axis.

3. The robot arm of claim 2, wherein the first roller and the second roller rotate in mutually opposite directions.

4. The robot arm of claim 2, wherein the first roller and the second roller are located on a same side as the first spring with respect to a first virtual plane passing through the first central axis of the first rotatable body and a first central axis of the first reference pulley, or on an opposite side from the first spring with respect to the first virtual plane passing through the first central axis of the rotatable body and the first central axis of the reference pulley.

5. The robot arm of claim 4, wherein the first roller and the second roller are positioned on the same side as the first spring with respect to a second virtual plane perpendicular to the first virtual plane and passing through the first central axis of the first rotatable body.

6. The robot arm of claim 1, wherein the first rotatable body comprises:
a pair of first large diameter portions spaced apart from each other along the first central axis of the first rotatable body; and
a first small diameter portion connecting the pair of first large diameter portions, and
wherein the plurality of first roller bearings is positioned between the pair of first large diameter portions and positioned outside of the first small diameter portion.

7. The robot arm of claim 1, further comprising:
a first spring guide located at the first arm; and
a first pressing portion located in the first spring guide, the first pressing portion being moveable within the first spring guide to compress the first spring.

8. The robot arm of claim 1, further comprising:
a second rotatable body connected to an end portion of the first arm and spaced from the first rotatable body, the second rotatable body defining a second central axis;
a second arm rotatable about the second central axis of the second rotatable body;
a second moving pulley located at the second arm, the second moving pulley arranged to revolve along a second circular track which is concentric with the second central axis;
a second reference pulley located at the second rotatable body, the second reference pulley being located between the second central axis and the second circular track;
a second spring located in the first arm, the second spring being compressible and stretchable along the first longitudinal axis of the first arm, the second spring being arranged in parallel with the first spring; and
a second windable member having a first end connected to the second spring and a second end connected to one of the second moving pulley or the second reference pulley, the second windable member being configured to compress the second spring as the second windable member is wound around the second moving pulley and the second reference pulley.

9. The robot arm of claim 8, further comprising:
a first timing gear configured to rotate together with the first rotatable body;
a second timing gear configured to rotate with respect to the second rotatable body; and
a timing belt configured to transmit a rotational force of the first timing gear to the second timing gear.

10. The robot arm of claim 9, wherein the second reference pulley is located at the second timing gear.

11. The robot arm of claim 9, wherein diameters of the first timing gear and the second timing gear are equal.

12. A robot arm comprising:
a base;
a first rotatable body located at the base, the first rotatable body defining a first central axis;
a first arm rotatable about the first central axis of the first rotatable body;
a first moving pulley located at the first arm, the first moving pulley arranged to revolve along a first circular track which is concentric with the first central axis;
a first reference pulley located at the base, the first reference pulley being located between the first central axis and the first circular track;
a first spring located in the first arm, the first spring being compressible and stretchable along a first longitudinal axis of the first arm;
a first windable member having a first end connected to the spring and a second end connected to one of the first reference pulley or the first moving pulley, the first windable member being configured to compress the first spring as the first windable member is wound around the first moving pulley and the first reference pulley;
a second rotatable body connected to an end portion of the first arm and spaced from the first rotatable body, the second rotatable body defining a second central axis;
a second arm rotatable about the second central axis of the second rotatable body;
a second moving pulley located at the second arm, the second moving pulley arranged to revolve along a second circular track which is concentric with the second central axis;
a second reference pulley located at the second rotatable body, the second reference pulley being located between the second central axis and the second circular track;
a second spring located in the first arm, the second spring being compressible and stretchable along the first longitudinal axis of the first arm, the second spring being arranged in parallel with the first spring;
a second windable member having a first end connected to the second spring and a second end connected to one of the second moving pulley or the second reference pulley, the second windable member being configured to compress the second spring as the second windable member is wound around the second moving pulley and the second reference pulley;
a first timing gear configured to rotate together with the first rotatable body;
a second timing gear configured to rotate with respect to the second rotatable body; and
a timing belt configured to transmit a rotational force of the first timing gear to the second timing gear,
wherein the second reference pulley revolves along a third circular track having a diameter smaller than a diameter of the second circular track, and
wherein the third circular track is concentric with the second central axis.

13. The robot arm of claim 8, wherein at least two of the plurality of first roller bearings comprise:
a first roller; and
a second roller spaced apart from the first roller in a direction of the first rotation axis.

14. The robot arm of claim 13, wherein the first roller and the second roller are located on a same side as the first spring with respect to a first virtual plane passing through the first central axis of the first rotatable body and a central axis of the first reference pulley, or on an opposite side from the first spring with respect to the first virtual plane passing through the first central axis of the first rotatable body and the central axis of the first reference pulley.

15. The robot arm of claim 14, wherein the first roller and the second roller are positioned on the same side as the first spring with respect to a second virtual plane perpendicular to the first virtual plane and passing through the first central axis of the first rotatable body.

16. A robot arm comprising:
a base;
a first rotatable body located at the base, the first rotatable body defining a first central axis;
a first arm rotatable about the first central axis of the first rotatable body;
a first moving pulley located at the first arm, the first moving pulley arranged to revolve along a first circular track which is concentric with the first central axis;
a first reference pulley located at the base, the first reference pulley being located between the first central axis and the first circular track;
a first spring located in the first arm, the first spring being compressible and stretchable along a first longitudinal axis of the first arm;
a first windable member having a first end connected to the spring and a second end connected to one of the first reference pulley or the first moving pulley, the first windable member being configured to compress the first spring as the first windable member is wound around the first moving pulley and the first reference pulley;
a second rotatable body connected to an end portion of the first arm and spaced from the first rotatable body, the second rotatable body defining a second central axis;
a second arm rotatable about the second central axis of the second rotatable body;
a second moving pulley located at the second arm, the second moving pulley arranged to revolve along a second circular track which is concentric with the second central axis;
a second reference pulley located at the second rotatable body, the second reference pulley being located between the second central axis and the second circular track;
a second spring located in the first arm, the second spring being compressible and stretchable along the first longitudinal axis of the first arm, the second spring being arranged in parallel with the first spring;
a second windable member having a first end connected to the second spring and a second end connected to one of the second moving pulley or the second reference pulley, the second windable member being configured to compress the second spring as the second windable member is wound around the second moving pulley and the second reference pulley; and
a plurality of second roller bearings arranged to be spaced apart from each other along an outer circumference of the second rotatable body, each second roller bearing being configured to rotate about a second rotation axis parallel to the second central axis of the second rotatable body, each second roller bearing being contactable with the second windable member.

17. The robot arm of claim 16, wherein at least two of the plurality of second roller bearings comprise:
a first roller; and
a second roller spaced apart from the first roller in a direction of the second rotation axis.

18. The robot arm of claim 17, wherein the first roller and the second roller rotate in mutually opposite directions.

* * * * *